April 9, 1963     K. IRBITIS     3,084,889
PNEUMATIC PROPELLER DRIVE SYSTEMS
Filed Dec. 1, 1960     2 Sheets-Sheet 1
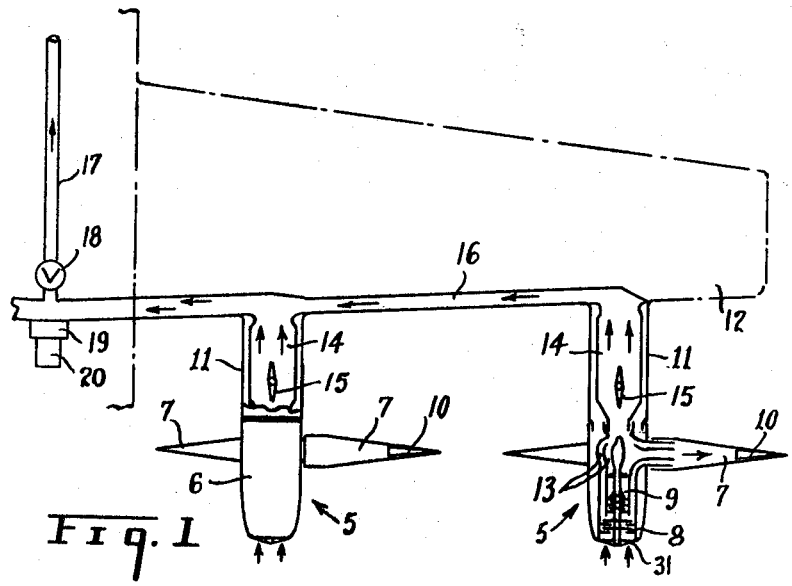
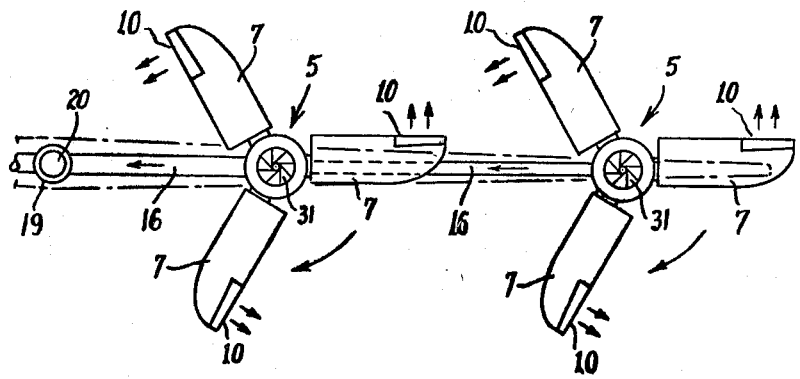
INVENTOR
KARL IRBITIS
By Fetherstonhaugh & Co.
ATTORNEYS

INVENTOR
KARL IRBITIS

United States Patent Office 3,084,889
Patented Apr. 9, 1963

3,084,889
PNEUMATIC PROPELLER DRIVE SYSTEMS
Karl Irbitis, Montreal, Quebec, Canada, assignor to Canadair Limited, Montreal, Quebec, Canada
Filed Dec. 1, 1960, Ser. No. 73,067
11 Claims. (Cl. 244—55)

This invention relates to pneumatic propeller drive systems and more particularly to the interconnecting of the engines in a multi-engined aircraft, whereby all, or a portion of the propulsive energy of one or more engines can be fed to another engine in the system, for the purpose of maintaining the propeller of the latter engine operative when the engine of that particular propeller is out of commission.

The invention consists essentially in the provision of a duct or ducts leading from the engines in a multi-engined aircraft into a common duct system and a system of valves whereby each engine can be isolated from the common duct system, either for the purpose of retaining the propulsive energy of each engine for the rotation of its own thrust system (propeller) as in starting up of the engine, or for isolating an engine from the common duct system when that particular engine and its thrust system (propeller) is in a damaged condition which would preclude feeding propulsive energy to it from the common duct system.

The thrust system which can be driven by propulsive energy from the common duct system includes propellers, ducted propellers and helicopter rotors and the drive means includes compressors and gas turbines feeding either compressed air or a combination of compressed air and hot gases to the thrust systems direct and to the common duct system.

The thrust system hereafter referred to is more particularly illustrated and described in co-pending patent application Serial No. 73,066 filed December 1, 1960.

At the present time attempts have been made to interconnect the thrust systems of multi-engined aircraft by mechanical means, such as gearing, for the purpose of being able to maintain operation of all thrust systems when the normal means driving one unit fails. This has added a weight penalty which is not acceptable and has the further disadvantage of high maintenance cost.

The object of the invention is to provide means whereby individual thrust systems in multi-engined aircraft can be maintained in operation from a common energy distribution system.

A further object of the invention is to provide means whereby individual thrust systems can by-pass all or a portion of their propulsive energy into a common system upon which other thrust systems can draw if required.

A further object of the invention is to provide means whereby compressed air or a combination of compressed air and hot exhaust gases from the engines driving the air compressor can be combined for delivery into a common energy distribution system.

A further object of the invention is to provide a common energy distribution system in which the energy fluid (compressed air or a combination of compressed air and exhaust gases) is kept at a relatively low temperature suitable for passing through a ducted system in aircraft.

These and other objects will be apparent from the following detailed description and the accompanying drawings, in which:

FIG. 1 is a plan view in diagrammatic form of a wing and a portion of a fuselage of an aircraft showing two individual thrust systems and a common duct system to which all or a portion of the propulsive energy development in the thrust systems can be diverted.

FIG. 2 is a front elevation of the system illustrated in FIG. 1.

Figure 3:
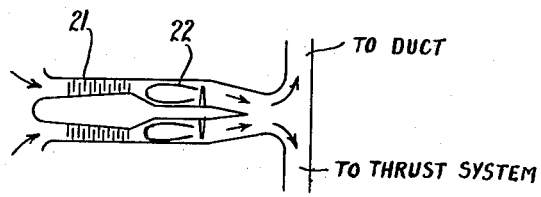
FIG. 3 is a diagrammatic showing of a turbojet engine in which the full flow of the gases is directed into the common duct system.

In the drawings, the pneumatic propeller drive system is illustrated as being applied to a winged aircraft of the usual type with propeller type thrust systems. However, it is to be understood that the invention can be applied to aircraft using ducted propellers VTOL aircraft and helicopters.

The thrust systems designated generally at 5 comprise a hub 6 and a series of propeller blades 7 mounted on the hub 6 for rotation about their axis from a feathered to a non-feathered position. The blades 7 are hollow to receive compressed air from the compressor 8 or a combination of compressed air and hot gases from the turbojet engine 9 driving the compressor 8. The air and hot gases are passed through the blade and are ejected at the blade tip nozzles 10 to impart rotation to the propeller blades 7 and hub 6 by the thrust reaction at the blade tip nozzles 10.

The hubs 6 are mounted for rotation on the outermost end of the nacelles 11 which in turn are mounted on the aircraft wings 12.

Each thrust system 5 is provided with suitable passages 13 permitting all or a portion of the compressed air from the compressor 8 or the hot gases from the turbojet engine 9 to pass into the chamber 14 situated within the nacelles 11. Valves 15 control the flow of compressed air or hot gases into the chambers 14 or the back flow from the chamber 14 to the thrust system.

A common duct system 16 connects with each and every nacelle chamber 14. A branch 17 from the duct 16, may be provided, to supply the necessary pneumatic power for rotation of a tail propeller. A valve 18 controls the flow from the duct 16 to the branch 17.

Auxiliary equipment such as the air turbine driven generator 19 and hydraulic pump 20 may be driven by air or hot gases direct from the common duct 16.

In FIGURES 3 to 7 inclusive, various forms of power units are shown diagrammatically. These power units can be substituted for the power unit shown in FIGURE 1.

In FIGURE 3, a full flow type of turbojet engine is shown in which all of the air compressed by the compressor 21 is delivered to the turbojet engine 22 and the resulting hot gases are directed to the thrust system 5 and/or to the common duct system 16 after the manner shown in FIGURE 1.

Figure 4:
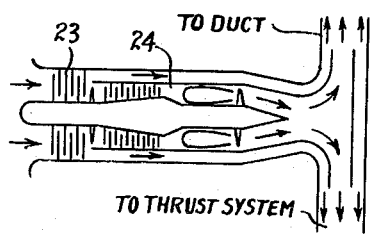
FIG. 4 is a diagram of a mixed uniflow system employing a by-pass engine.

In FIGURE 4, a turbojet engine of the by-pass type is shown. In this form, some of the compressed air from the compressor 23 is drawn through the turbojet engine 24 while the balance of the compressed air by-passes the turbojet engine. The by-passed compressed air and the hot gases of combustion combine and are directed to the thrust system or the common duct as in FIGURE 3.

Figure 5:
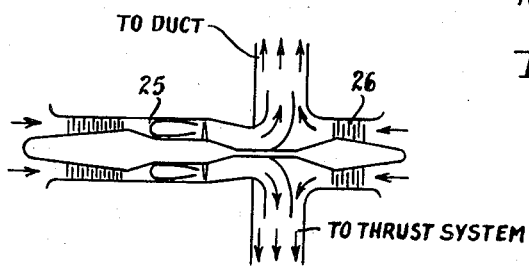
FIG. 5 is a diagram of a mixed flow contra-flow system employing an auxiliary air compressor.

In FIG. 5, the turbojet engine 25 is of the same type as that shown in FIG. 3 but drives an auxiliary air compressor 26. In this assembly, all of the air from the auxiliary compressor 26 is delivered to the thrust system and/or the common duct. In addition, all of the hot gases of combustion from the turbojet engine are also delivered to the thrust system or the common duct. In this form, the combined compressed air and gases of combustion as delivered to the thrust system or common duct will tend to be considerably cooler than in the case in either FIGS. 3 and 4.

Figure 6:
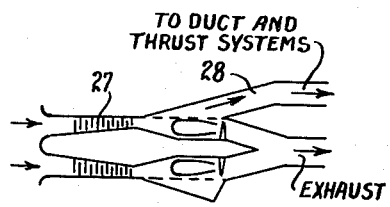
FIG. 6 is a diagram of a divided flow system in which compressed air is delivered to the common duct system and the hot gases are exhausted to the atmosphere.

In FIG. 6, the compressed air from the compressor 27 is divided, a large portion of the air being directed through the passage 28 for delivery to the thrust system and/or the common duct, the balance of the air passing through the turbojet engine and exhausted in the form of exhaust gases to the atmosphere.

Figure 7:
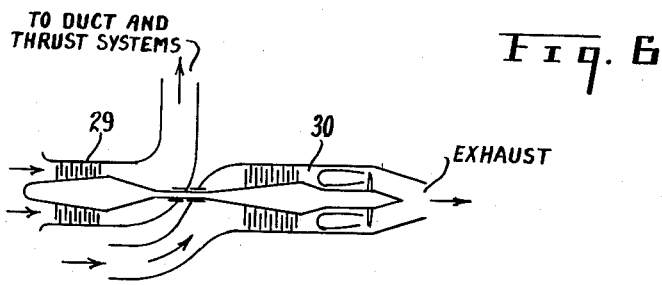
FIG. 7 is a diagram of a divided flow system in which the compressor delivering air to the common duct system is driven by a separate turbojet engine whose inlet and exhaust have no connection with the duct system.

In FIG. 7, the air compressor 29 and the turbojet engine 30 each are provided with their own individual air inlet with the compressed air from the compressor 29 being delivered direct to the thrust system and/or the common duct while the gases of combustion from the turbojet engine are exhausted to the atmosphere.

In the multiple thrust system shown in FIGS. 1 and 2, the nacelle chambers 14 act as accumulators and the ducts 16 will be non-operative and filled with stagnant compressed gas. The gas flow of the turbo tip jet propellers are equalized so that in the case where one gas producer becomes inoperative, the others supply the needed mass flow through the interconnected duct to the respective tip jet propeller. To avoid escape of compressed air through a non-operative engine (with operative propeller) a shutter 31 is fitted at the engine intake. Only in starting up the separate thrust systems, will the gas producers be isolated from the duct system in order that the full power of the gas producer be available for starting, and starting would not be against the pressure created by the other working engines.

The compressed gas from the common duct system may be employed to drive accessories such as generators and hydraulic pumps, by means of an air turbine. The availability and distribution of compressed gas together with the accumulating action of the gas volume in the duct system can also be adopted for operating flaps, landing gear and other equipment of the aircraft.

When the interconnecting duct is located inside the leading edge of the wing as shown in FIGS. 1 and 2, the complete installation (in addition to its normal use) serves as a very efficient de-icing system for wings and propellers, eliminating the weight penalty normally associated with such a system.

The interconnection of the thrust system whereby a balance of power is achieved in all of the thrust systems increases the safety factor and is of particular importance in VTOL aircraft.

What I claim is:

1. In aircraft having multiple turbo tip jet propeller thrust systems, each of said thrust systems including a bladed propeller, turbo tip jet nozzles in each of the blades of said propeller, a gas producer located ahead of the said propeller, means to feed a flow of gas from said gas producer through said blades to the said tip jet nozzles, a common duct interconnecting the gas producers of each of said thrust systems, the said common duct forming a gas energy reservoir common to all of said thrust systems, and means to isolate each of the said thrust systems from the said reservoir while the said gas producers are operating and to connect any one of the said thrust systems to the said reservoir when its individual gas producer ceases to operate.

2. In aircraft as set forth in claim 1, in which the said gas producers include an air compressor having an air intake and a compressed air outlet, the air intake of any one gas producer being closed when its gas producer is inoperative and connected to the said common duct.

3. In aircraft as set forth in claim 1, in which the said last named means comprises valve means whereby any one thrust system may be isolated from the common duct system.

4. In aircraft as set forth in claim 2, in which the compressed air outlet of each air compressor feeds air into its associated thrust system and into an air accumulator interposed between the said thrust system and the said common duct system.

5. In aircraft as set forth in claim 4, in which the said air accumulators are in the form of nacelles mounted on the leading edge of the wings of the aircraft.

6. In aircraft as set forth in claim 1, in which the said common duct is located in the leading edge of the aircraft wings.

7. In aircraft as set forth in claim 2, in which the said air compressors are driven by turbojet engines and the hot exhaust gases from the turbojet engines are combined with the compressed air in the common duct to raise the temperature of the compressed air in the common duct.

8. In aircraft as set forth in claim 7, in which the common duct is located in the leading edge of the aircraft wings and forms a de-icer for the aircraft wings.

9. In aircraft as set forth in claim 2, in which the said air compressors are driven by turbojet engines and the compressed air from the compressor is heated by the said turbojet engines before delivery of the compressed air to the said common duct and turbojet propellers.

10. In aircraft as set forth in claim 1, in which the said common duct provides a source of compressed air operating supply for auxiliary equipment associated with the said aircraft.

11. In aircraft as set forth in claim 2, in which the air intake to the compressor is provided with a shutter, operable to close the said air intake when the said compressor is inoperable and the said propeller is operably maintained by pneumatic energy from the common reservoir.

References Cited in the file of this patent

UNITED STATES PATENTS

| | | |
|---|---|---|
| 2,501,078 | Newcomb | Mar. 21, 1950 |
| 2,780,423 | De Cenzo | Feb. 5, 1957 |

FOREIGN PATENTS

| | | |
|---|---|---|
| 295,272 | Italy | Apr. 16, 1932 |